United States Patent [19]

Sorenson

[11] Patent Number: 4,989,118
[45] Date of Patent: Jan. 29, 1991

[54] OFF-SET TERMINAL CONFIGURATION FOR ELECTRICALLY COUPLING THE LOAD SIDE OF ADJACENT CIRCUIT BREAKERS

[75] Inventor: Richard W. Sorenson, Avon, Conn.

[73] Assignee: Carlingswitch, Inc., Plainville, Conn.

[21] Appl. No.: 341,470

[22] Filed: Apr. 21, 1989

[51] Int. Cl.⁵ ............................................. H02B 1/00
[52] U.S. Cl. .................................... 361/376; 200/307; 361/378; 439/715
[58] Field of Search ............... 200/284, 307; 361/341, 361/342, 348, 350, 351, 353, 355, 356, 360, 361, 363, 427, 376–378; 439/715, 717

[56] References Cited

U.S. PATENT DOCUMENTS

| | | | |
|---|---|---|---|
| 3,120,627 | 2/1964 | Herrmann | 361/376 |
| 3,148,312 | 9/1964 | Fouse | 361/378 |
| 3,204,150 | 8/1965 | Gauthier | 361/376 |
| 4,002,398 | 1/1977 | Hanisch et al. | 439/715 X |
| 4,591,228 | 5/1986 | Vasseur | 439/715 |

Primary Examiner—J. R. Scott
Attorney, Agent, or Firm—McCormick, Paulding & Huber

[57] ABSTRACT

The load terminals of several side-by-side circuit breakers are formed from an initially flat configuration to define an offset laterally projecting flag portion that mates with another portion of an identical adjacent terminal to provide aligned openings, one of which is threaded, for receiving a conventional screw.

3 Claims, 3 Drawing Sheets

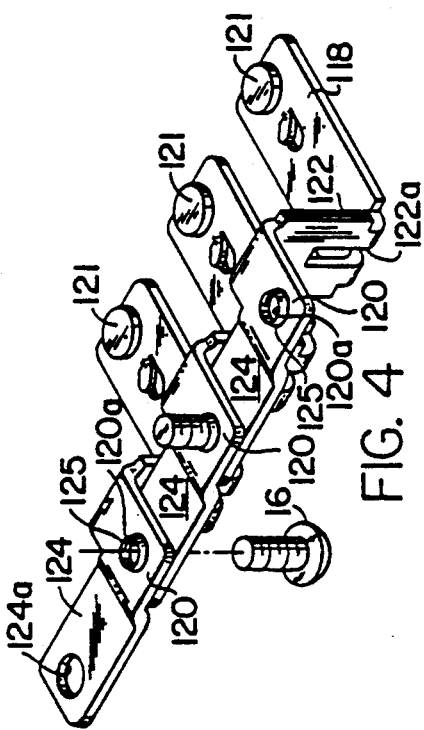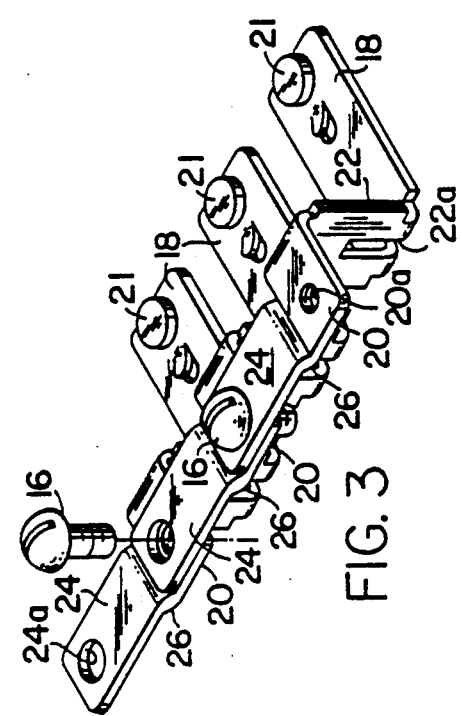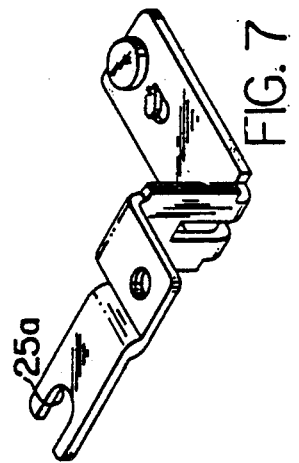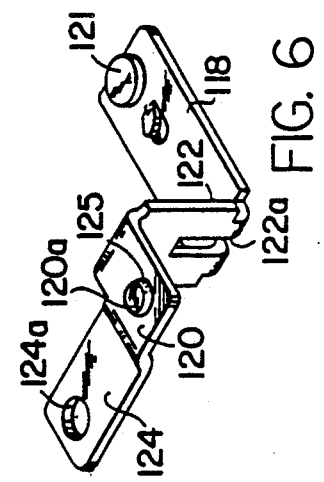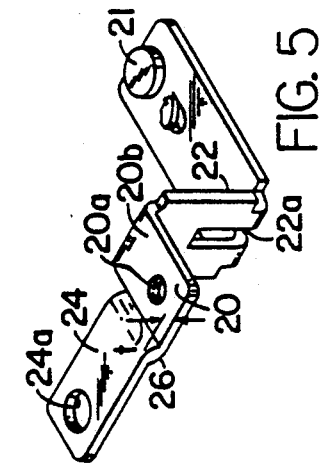

OFF-SET TERMINAL CONFIGURATION FOR ELECTRICALLY COUPLING THE LOAD SIDE OF ADJACENT CIRCUIT BREAKERS

This invention relates generally to improvements in the terminals provided in a circuit breaker such that a plurality of side-by-side circuit breakers can be conveniently connected electrically on the load side without the necessity for providing a common bus bar or otherwise innerconnecting the terminals by conductive components in addition to the common screw fastener.

Circuit breakers generally are designed to be either "front" mounted in which case access to the terminal screw is afforded at the back of the breakers; or to be "rear" mounted such as on a DIN rail or the like, with the result that access to the terminal screw normally provided at the ends of the individual breakers is reversed.

According to prior art techniques projecting circuit breaker load terminals are commonly bussed by means of a bus bar having a plurality of oversize openings through which openings individual screws are inserted to electrically interconnect several circuit breakers. Each load terminal of each breaker has a threaded opening for receiving such a screw.

The chief aim of the present invention is to obviate the need for such a bus bar, and to provide a load terminal configuration that permits adjacent terminals to be connected simply by inserting a screw into an opening provided for this purpose in a flag or offset segment in each of the load terminals.

SUMMARY OF THE INVENTION

In accordance with the present invention a conventional circuit breaker housing is provided with electrical terminals that are coupled to an internal circuit breaker mechanism. Such a breaker mechanism operates electrical contacts, one of which is adapted to be opened by the circuit breaker mechanism in response to an overvoltage and/or overcurrent condition. The present invention deals with an improvement to at least one of the electrical terminals and preferably to the load terminal of such a breaker. These terminals are generally formed from an initially flat strip that includes an internal portion provided within the breaker itself, and an external portion that is adapted to be electrically connected to an electrical conductor. An intermediate portion integrally connects the internal and external portions of the terminal and is adapted to be secured in the breaker housing end wall or in some cases the bottom wall. Typically, circuit breaker housings are fabricated from two half sections so that the terminal strip intermediate portion is generally locked in aligned slots provided in each of these half sections. The internal portion of the terminal preferably includes conventional means for electrically coupling the terminal to a component of the breaker mechanism as for example the fixed contact provided for this purpose in the breaker mechanism and selectively engageable by a movable contact provided in the circuit breaker mechanism.

In accordance with the present invention the external portion of the terminal includes a projecting portion that is conventionally provided with a threaded opening for receiving the screw normally provided in such circuit breaker terminals generally. However, this projecting segment or portion further includes a laterally offset flag portion that is adapted to lay adjacent the projecting portion of an adjacent terminal associated with an adjacent circuit breaker. This flag portion includes an opening or slot for loosely receiving a screw that is inserted into the opening or slot and that is threadably received in the threaded opening of an adjacent terminal projecting portion.

The offset or flag portion of the terminal can be provided either above or below the adjacent projecting terminal portion of the adjaent breaker in order to accommodate an associated screw provided either forwardly or rearwardly, depending upon the manner in which the breaker is to be mounted (that is to a panel or to a DIN rail for example).

BRIEF DESCRIPTION OF THE DRAWINGS

FIG. 3 is a detailed view of the load terminals depicted in FIG. 2 but with the breakers omitted.

FIG. 4 is a view similar to FIG. 3 but showing an alternative embodiment.

FIG. 5 is a detailed perspective view of one terminal of the type illustrated in FIGS. 2 and 3.

FIG. 6 is a detailed perspective view of one terminal of the type illustrated in FIG. 4.

FIG. 7 shows a still further embodiment of the inventory.

DETAILED DESCRIPTION

Figure 1:
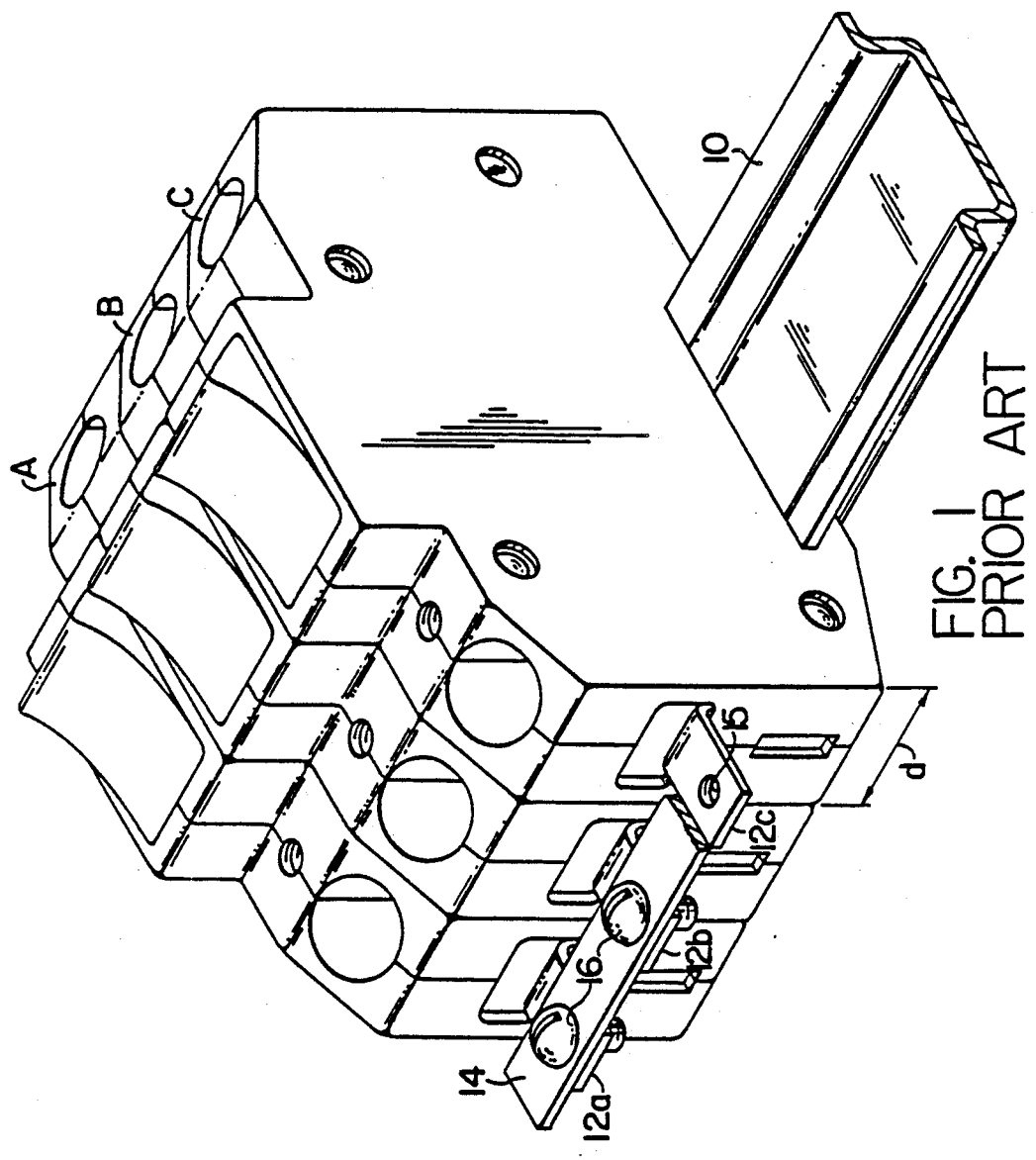
FIG. 1 is a perspective view illustrating a plurality of breakers, each with a projecting load terminal, and also illustrates the prior art bus bar technique for electrically innerconnecting these terminals.

Turning now to the drawings in greater detail, FIG. 1 shows a stack of circuit breakers A, B and C each of which has an operating lever in the form of a rocker and each of which is mounted in side-by-side relationship on a conventional DIN rail 10 by suitable means (not shown).

In accordance with conventional practice the breakers are oriented so that those terminals associated with the fixed contact project outwardly along a predetermined end of the breaker as suggested generally by 12a, 12b and 12c. Assuming that the breaker has a depth d as suggested in FIG. 1 these terminals 12a, 12b and 12c are spaced from one another by this dimension d and in accordance with conventional practice can be electrically coupled to one another by a bus bar 14 with openings to receive screws 16, 16. The screws are provided in the openings of the bus bar 14 and are threadably received in tapped openings 15 provided for this purpose in the terminals 12a, 12b and 12c.

Figure 2:
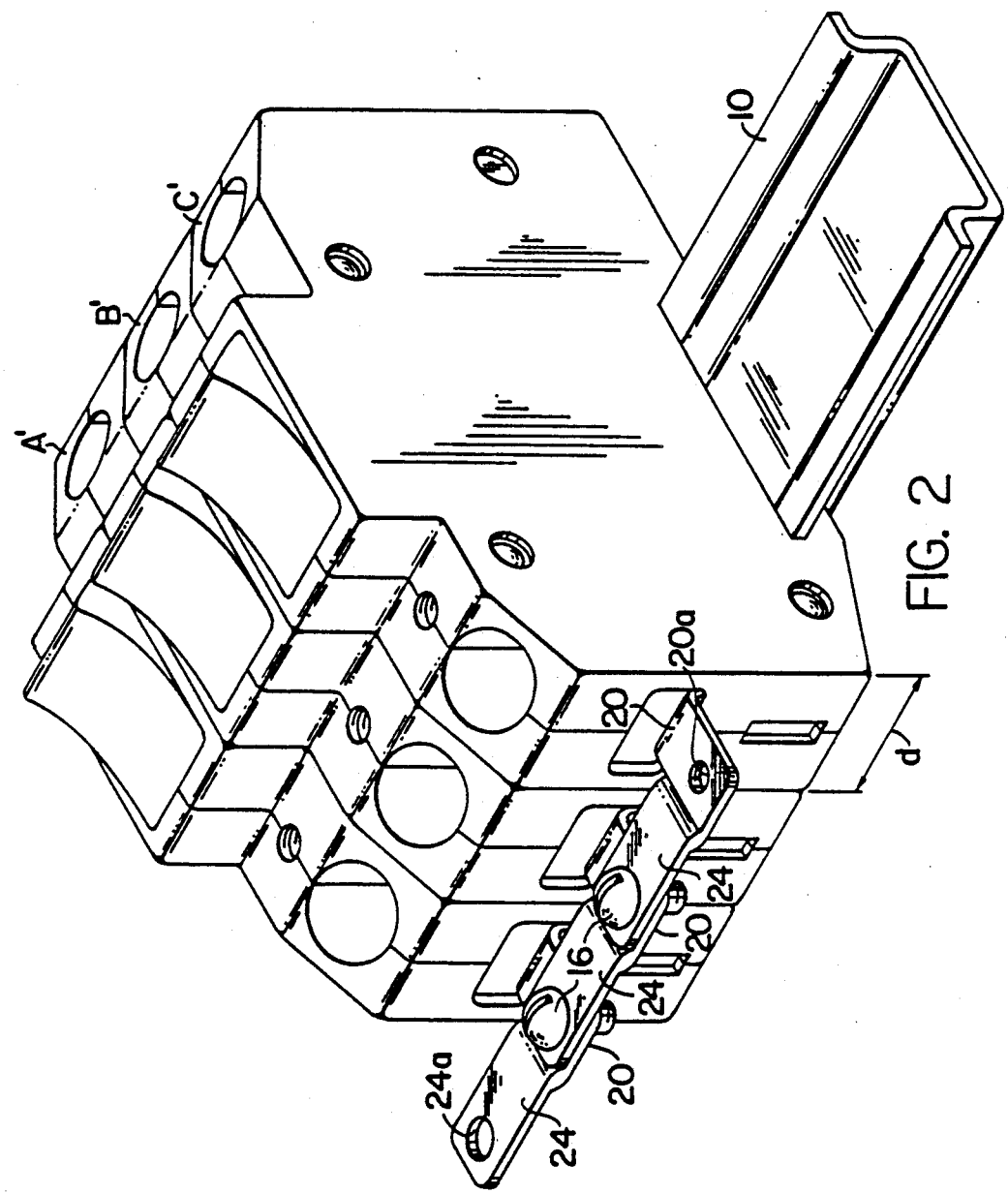
FIG. 2 is a view similar to FIG. 1 but illustrating several adjacent circuit breakers fitted with load terminals of the present invention, together with screws for electrically and mechanically connecting these terminals to one another so that the need for the bus bar of FIG. 1 is obviated.

In accordance with the present invention the need for such a bus bar 14 as described above is obviated by providing a unique terminal in each of several circuit breaker A', B', C' as shown in FIG. 2. FIG. 5 shows one such terminal. Both the FIG. 5 terminal and that shown in FIG. 1 have a portion inside the circuit breaker housing defining an internal portion 18, and an integrally defined external portion 20 that projects outside of the circuit breaker housing as shown in FIG. 1 and FIG. 5. The internal portion 18 defines a fixed contact 21 and the intermediate terminal portion 22 provided inside the circuit breaker housing may be slotted as indicated generally at 22a.

The external portion 20 of the terminal of FIG. 5 includes a boss defining a threaded opening 20a adapted to threadably receive a standard screw such as that illustrated at 16 in FIG. 1. A stepped segment 24 of the external terminal portion 20 is integrally connected to the external portion 20 by an offset portion 26 such that the lower surface of the offset segment 24 is provided in the same general plane as the upper surface 20b of the external terminal portion 20 of an adjacent terminal as shown in FIGS. 2 and 3. This offset provides the flag portions 24, 24 in a plane that is spaced from the plane of the portions 20, 20 by a dimension t corresponding to the thickness of the terminal itself. This offset segment 24 also includes an opening 24a adapted to loosely receive the screw 16 as suggested in FIG. 3.

As so constructed and arranged the unique terminal of the type described with reference to FIG. 5 in each of the side-by-side circuit breakers A', B' and C' of FIG. 2 results in an assembly such that these terminals have their offset segments or flags lying adjacent to one another so that the screws 16, 16 can be loosely received in oversized openings 24a of each such external terminal portion 24 and also threadably received in the opening 20a of an adjacent terminal 20. The opening 24a and the threaded opening 20a in each of these terminals are spaced apart a distance d corresponding generally to the overall depth d of the circuit breaker housing itself.

As described above any number of breakers can be combined in a stack to provide innerconnected terminals without necessity for the bus bar 14 illustrated in FIG. 1. As described herein the screws 16, 16 are loosely received in oversize openings 24a in the terminals and threadably received in the underlying threaded openings 20a of the adjacent terminal. This configuration is suitable for use in installing breakers on a DIN rail of the type illustrated at 10 in FIG. 1 or any installation where the breakers are to be mounted so as to permit access to these screws from the front of the breakers (that is from the handle or rocker portion of the breaker).

Where, the breakers are of the type adapted to be mounted to the rear of a panal, and access must be had from the opposite direction (that is from the rear of the breakers) to install such breakers the offset should be provided in an opposite direction so as to permit the screws 16 to be oppositely directed through oversized openings 124a in the offset portions 124 of the terminals as shown in FIG. 4. It should be noted that the internal portions 118, fixed contacts 121, each of the intermediate terminal portions 122 and the slotted configurations 122a as shown in FIGS. 4 and 6 correspond to like terminal parts illustrated in FIGS. 3 and 5. Threaded openings 120a are defined in bosses 125 in the portions 120 to provide for threadably receiving the screws 16 as shown in FIG. 4.

FIG. 6 shows in detail one such terminal of the type shown in assembled relationship in FIG. 4. Note that the upper surface of each offset segment 124 abuts the undersurface of the adjacent terminal offset portion in FIG. 4.

FIG. 7 shows still another version of the invention, being similar to that of FIG. 5, but including a slot 25a instead of the oversize opening 24a of the FIG. 5 version. This slot 25a allows for removal of a single breaker from a stack such as that shown in FIG. 2, without the necesity of completely removing the screw 16 as would be the case for breakers equipped with the FIG. 5 terminals.

I claim:

1. In combination with a stack of adjacent circuit breakers wherein each circuit breaker has an internal circuit breaker mechanism provided inside a thermoplastic housing of generally rectangular configuration with a depth d such that providing a plurality N of such circuit breaker housing adjacent to one another results in assembly of total depth N times d, the improvement comprising a terminal for each of said plurality of breakers, each said terminal including an internal portion inside the housing for electrical connection to the circuit breaker mechanism, and said terminal also having an external portion outside the housing, said external portion including a first segment oriented generally perpendicularly to the housing end wall and defining an opening, and a flag segment integrally connected to said first segment by an offset portion, said flag segment including an opening spaced by at least approximately the dimension d from said opening in said first segment so as to be generally aligned with an opening in the first segment of an adjacent circuit breaker terminal, said first segment of each of said adjacent circuit breakers lying in a common plane, each said offset portion providing its corresponding flag segment in a common plane spaced from said first mentioned plane by the thickness t of said terminal.

2. The combination of claim 1 wherein said opening in said flag segment is threaded and is defined in a raised boss projecting in a direction oppositely from said offset portion, and wherein said boss defines an internal thread for threadably receiving a screw.

3. The combination of claim 2 wherein said terminal is fabricated from an initially flat strip of conductive material and is provided with a contact on its internal portion, and wherein said opening in said first segment of said external portion has a diameter slightly larger than the diameter of the threaded opening in an adjacent terminal flag segment for loosely receiving a screw that is threadably received in said threaded opening of said adjacent terminal.

* * * * *